US008423750B2

(12) United States Patent
Hall et al.

(10) Patent No.: US 8,423,750 B2
(45) Date of Patent: Apr. 16, 2013

(54) HARDWARE ASSIST THREAD FOR INCREASING CODE PARALLELISM

(75) Inventors: Ronald P. Hall, Cedar Park, TX (US);
Hung Q. Le, Austin, TX (US); Raul E. Silvera, Woodbridge, CA (US);
Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 12/778,192

(22) Filed: May 12, 2010

(65) Prior Publication Data
US 2011/0283095 A1 Nov. 17, 2011

(51) Int. Cl.
*G06F 9/48* (2006.01)
(52) U.S. Cl.
USPC .......................................... 712/220; 717/119
(58) Field of Classification Search .................. None
See application file for complete search history.

(56) References Cited

U.S. PATENT DOCUMENTS

| | | | |
|---|---|---|---|
| 7,328,433 | B2 | 2/2008 | Tian et al. |
| 7,343,595 | B2 * | 3/2008 | Iley et al. ....................... 717/141 |
| 7,689,989 | B2 | 3/2010 | Dostert et al. |
| 2002/0144083 | A1 | 10/2002 | Wang et al. |
| 2005/0125802 | A1 | 6/2005 | Wang et al. |
| 2007/0022422 | A1 | 1/2007 | Tirumalai et al. |
| 2007/0271565 | A1 | 11/2007 | Tirumalai et al. |
| 2008/0046689 | A1 * | 2/2008 | Chen et al. ....................... 712/24 |
| 2008/0141268 | A1 | 6/2008 | Tirumalai et al. |
| 2008/0215861 | A1 * | 9/2008 | Aamodt et al. ............... 712/226 |
| 2008/0301683 | A1 * | 12/2008 | Archer et al. ................. 718/102 |
| 2009/0043992 | A1 | 2/2009 | Mannarswamy et al. |
| 2009/0119481 | A1 * | 5/2009 | Vishkin ........................... 712/29 |

FOREIGN PATENT DOCUMENTS

WO     WO 2007/048132 A2     4/2007

OTHER PUBLICATIONS

Wallace, S., etal., Threaded Multiple Path Execution, 1998, IEEE, pp. 238-249.*
Palatin, P., etal., CAPSULE: Hardware-Assisted Parallel Execution of Component-Based Programs, 2006, IEEE, 12 pages.*
Wang., P.H. etal., Helper Threads Via Virtual Multithreading, 2004, IEEE, pp. 74-82.*
International Search Report and Written Opinion dated Jun. 24, 2011 for International Application No. PCT/EP2011/057106, 9 pages.
U.S. Appl. No. 13/438,087.

* cited by examiner

*Primary Examiner* — Eric Coleman
(74) *Attorney, Agent, or Firm* — Stephen J. Walder, Jr.; Libby Z. Toub (57) ABSTRACT

Mechanisms are provided for offloading a workload from a main thread to an assist thread. The mechanisms receive, in a fetch unit of a processor of the data processing system, a branch-to-assist-thread instruction of a main thread. The branch-to-assist-thread instruction informs hardware of the processor to look for an already spawned idle thread to be used as an assist thread. Hardware implemented pervasive thread control logic determines if one or more already spawned idle threads are available for use as an assist thread. The hardware implemented pervasive thread control logic selects an idle thread from the one or more already spawned idle threads if it is determined that one or more already spawned idle threads are available for use as an assist thread, to thereby provide the assist thread. In addition, the hardware implemented pervasive thread control logic offloads a portion of a workload of the main thread to the assist thread.

11 Claims, 4 Drawing Sheets

HARDWARE ASSIST THREAD FOR INCREASING CODE PARALLELISM

BACKGROUND

The present application relates generally to an improved data processing apparatus and method and more specifically to mechanisms for selecting a hardware assist thread from a pool of available threads to thereby increase code parallelism and improve overall performance.

In modern processor architectures and configurations, the concept of a multi-threaded processing has been introduced. A thread of execution, or simply a "thread", typically results from a fork in the execution of a computer program into two or more concurrently running tasks, such as at a loop (where some iterations are performed by one thread and other iterations are performed by one or more other threads, or branch instruction where the various possible branches are executed speculatively by different threads. The implementation of threads and processes differs from one operating system to another, but in most cases, a thread is contained inside a process. Multiple threads can exist within the same process and share resources, such as memory, while different processes may not share these resources.

On a single processor, multithreading generally occurs by time-division multiplexing where the processor switches between different threads. This context switching generally happens frequently enough that the user perceives the threads, or tasks, as running at the same time. On a multiprocessor or multi-core system, the threads or tasks will generally runt at the same time with each processor or core running a particular thread or task.

In known multi-threaded processors, if software needs to off-load a thread's workload to another thread, the original thread must start, or spawn, a physical thread by going through all the steps of context switching, context synchronization, and data transfer from one thread to another thread using the memory. A "context" is the minimal set of data used by the thread that must be stored to allow an interrupt of the thread's execution and a continuation of the thread after handling the interrupt. A "context switch" is the process of storing and restoring the state of a processor so that execution of a thread can be resumed from the same point at which the thread stopped executing, or was interrupted. Context switches are usually computationally intensive and requires a certain amount of time for doing the administrative operations of saving and loading registers and memory maps, updating various tables and lists, and other overhead intensive operations.

"Context synchronization" means the operations performed to ensure that the newly started or spawned thread has a context corresponding to the thread from which the workload is being offloaded so that the workload can continue to be processed as if it were being processed by the original thread. This involves making sure that the newly started or spawned thread has a substantially same context as the original thread. Furthermore, data may need to be transferred for use in the context of the newly started or spawned thread.

In addition to the overhead associated with the context switch and synchronization, threads must be placed in a quiescent state so that a new thread may be started or spawned. Thereafter, the threads must be restarted or placed back into an idle state. This increases the overall latency and overhead for off-loading the work onto another thread.

In general this approach for off-loading workloads from one thread to another works fine on completely independent and long program code. However, for short program code, or individual tasks such as prefetching, non-synchronous operations, pre-computation, or the like, on speculative parallelized loops, the latency of starting a new physical thread by software will overshadow the potential gain in performance by off-loading the work onto another thread.

SUMMARY

In one illustrative embodiment, a method, in a data processing system, is provided for offloading a workload from a main thread to an assist thread. The method comprises receiving, in a fetch unit of a processor of the data processing system, a branch-to-assist-thread instruction of a main thread. The branch-to-assist-thread instruction informs hardware of the processor to look for an already spawned idle thread to be used as an assist thread. The method further comprises determining, by hardware implemented pervasive thread control logic in the processor, if one or more already spawned idle threads are available for use as an assist thread. The method also comprises selecting, by the hardware implemented pervasive thread control logic, an idle thread from the one or more already spawned idle threads if it is determined that one or more already spawned idle threads are available for use as an assist thread, to thereby provide the assist thread. In addition, the method comprises offloading, by the hardware implemented pervasive thread control logic, a portion of a workload of the main thread to the assist thread.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for selecting and using a hardware assist thread to which a workload may be offloaded. The mechanisms of the illustrative embodiments enable software and hardware to work together by spawning an assist thread that is selected from a free available idle thread. This reduces the latency from that experienced by known systems that use the above described method of starting or spawning a new physical thread by the software. The mechanisms of the illustrative embodiments use the observation that in a simultaneous multithreaded (SMT) processor architecture, there is often one or more threads that are idle and are not performing useful work that may be commandeered to assist with the offload of workloads from other threads.

With the mechanisms of the illustrative embodiments, whenever a compiler can identify a task that is a candidate for parallel execution, the compiler injects into the code a special instruction, referred to herein as "branch to assist thread" instruction, that looks for idle threads that may be used as hardware supported assist threads. Once this special instruction is fetched down from a regular main thread, an assist thread can be spawned off of the main thread if there is a free idle thread available to the task. Meanwhile, the regular main thread can continue to execute the rest of the program while the assist thread is performing the parallel operations. The main thread is provided with functionality for checking on the assist thread's status by checking the state of a special register (SPR) or designated memory location so that the main thread can take appropriate action based on the state.

The hardware based spawning of an assist thread performed by the mechanisms of the illustrative embodiments reduces overhead when compared to traditional software based approaches, which require the operating system to perform various operations to spawn a new thread, in that not all of the data of the main thread's context needs to be copied over into the assist thread's context. That is, in most of the cases, only a subset of the registers need to copy over due to only a subset of the registers being actually used or changed. However, software or hardware cannot communicate to the operating system what registers need to be copied over dynamically. As a result, in known mechanisms, the operating system can only perform one context switch routine to cover all the cases to ensure function correctness and avoid covert channels. Thus, all of the registers are typically copied over.

In the illustrative embodiments, only a subset of the registers are chosen under the rules of spawning off a new thread that does not post any covert channel and stays in the same memory pages and address translation ranges. Of course, these requirements can be vary from application to application and system to system. To address this variation, the illustrative embodiments provide a copy-on-demand function in the branch to assist instruction to allow software to have more control on what needs to be copied over. Once the assist thread is executing, hardware will continue to monitor the assist thread and determine that the assist thread does not violate the rules of preventing covert channels and staying in the same memory pages and address translation ranges. If the assist thread does violate these rules, the assist thread will be aborted and the main thread has to pick up the work of the assist thread as if the assist thread had never started in the first place.

With the illustrative embodiments, only the general purpose registers (GPRs) and a few designated special purpose registers (SPRs) of the main thread's context are copied over to the assist thread's context. Other registers, such as the floating point registers (FPRs) and vector registers (VRs) of the register file may be copied over on an "on-demand" basis based on the type of branch to assist instruction which may include fields for indicating whether VRs and FPRs need to be copied over. This reduces the overhead of spawning the assist thread and makes the operation much faster than spawning a new thread using software mechanisms which copy all the state information from the registers of the main thread context. Thus, rather than pushing all of the data to memory from one thread and copying it back to another thread's context, the mechanisms of the illustrative embodiments use hardware resources to copy data from one thread context to another directly without going through the memory. In this way, the copy routine is much smaller and executed more quickly.

Moreover, since the operations are performed entirely within the hardware, and hardware functions much faster than software, the speed of the operation is further increased through the mechanisms of the illustrative embodiments. That is, the short latency associated with using hardware to temporarily "borrow" an existing idle thread to act as an assist thread for off-loading a main thread's workload without going through the whole software process of starting, synchronization, and exiting from the operation for creating a new thread, increases the performance of the software program. Moreover, improvements in the overall optimization of threads in a multi-thread processor system are achieved because the hardware mechanisms of the illustrative embodiments avoid the long latencies of entry and exit points of software spawned threads.

The mechanisms of the illustrative embodiments may be used to increase the efficiency with which particular types of operations are performed by the code executed by the processor. For example, the "branch to assist thread" instruction may be inserted by a compiler into portions of code associated with prefetch instructions for prefetching data or instructions into cache memory, prefetching address translations into an effective to real address translation (ERAT) unit or translation lookaside buffer (TLB), to offload non-synchronous operations, for precomputation of speculatively executable portions of code, or the like. The compiler may analyze the code to identify such types of operations/instructions so that the compiler may then insert the new "branch to assist thread" instruction so that such work of these operations/instructions may be offloaded to an assist thread borrowed, by the hardware of the processor, from existing idle threads.

As will be appreciated by one skilled in the art, the aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
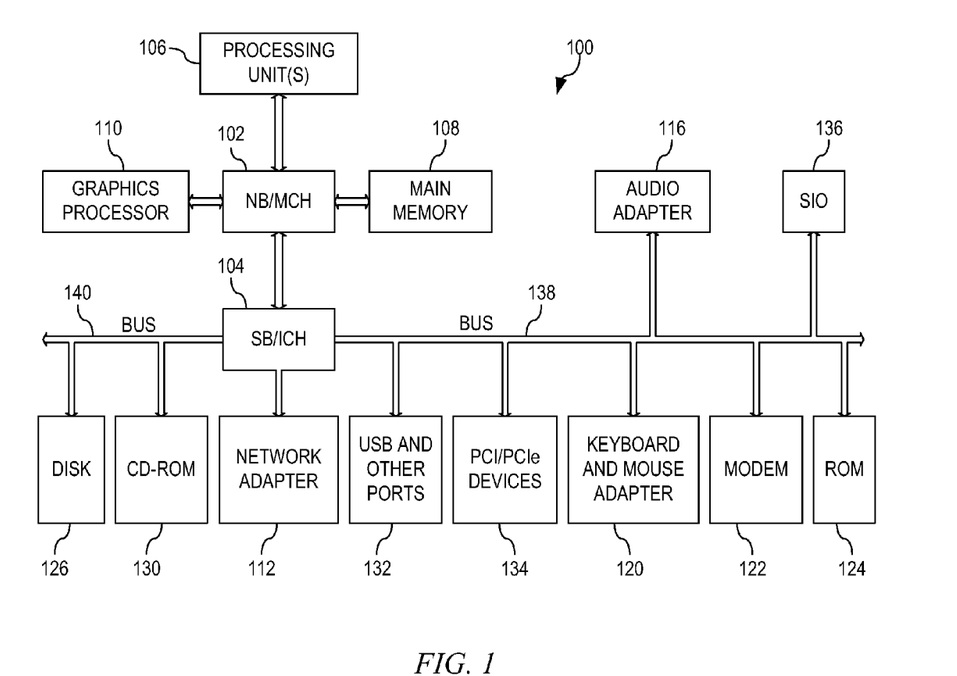
FIG. 1 is an exemplary data processing system in which aspects of the illustrative embodiments may be implemented.

With reference now to FIG. 1, an exemplary data processing system is shown in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 204. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 100 (Java is a trademark of Sun Microsystems, Inc. in the United States, other countries, or both).

As a server, data processing system 100 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 206. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

With the data processing system 100 of FIG. 1, the processor 106 may have facilities for processing both integer (scalar) and floating point (vector) instructions and operating on both types of data. However, in accordance with the illustrative embodiments, the processor 106 may have hardware facilities for handling SIMD instructions and data as floating point only SIMD instructions and data. The scalar facilities are used for integer processing, and in conjunction with the floating point only SIMD architecture for inter alia loop control and memory access control.

Figure 2:
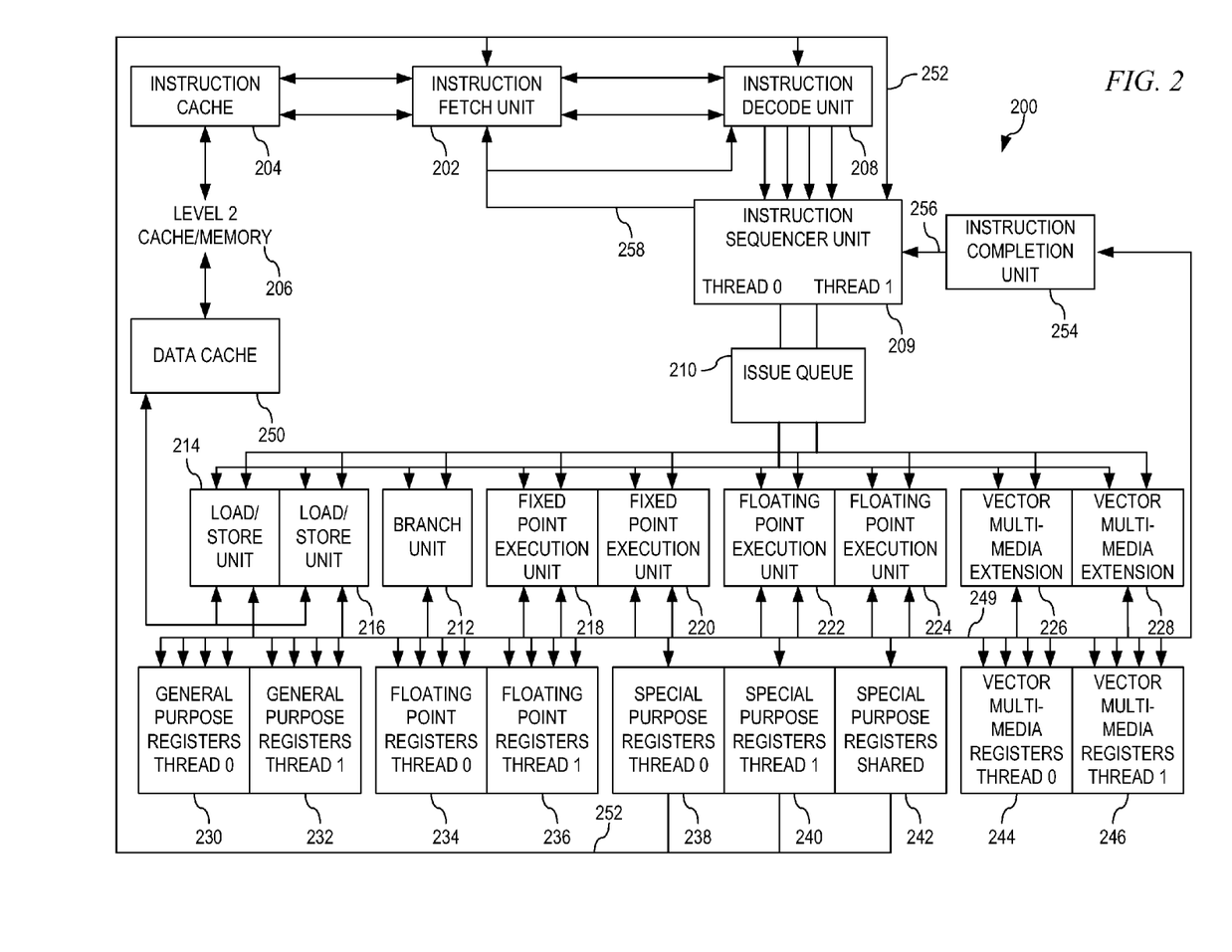
FIG. 2 is an exemplary block diagram of a dual threaded processor design showing functional units and registers in accordance with an illustrative embodiment.

Referring to FIG. 2, an exemplary block diagram of a dual threaded processor design showing functional units and registers is depicted in accordance with an illustrative embodiment. Processor 200 may be implemented as processing unit 106 in FIG. 1 in these illustrative examples. Processor 200 comprises a single integrated circuit superscalar microprocessor with dual-thread simultaneous multi-threading (SMT) that may also be operated in a single threaded mode. Accordingly, as discussed further herein below, processor 200 includes various units, registers, buffers, memories, and other sections, all of which are formed by integrated circuitry. Also, in an illustrative embodiment, processor 200 operates according to reduced instruction set computer (RISC) techniques.

As shown in FIG. 2, instruction fetch unit (IFU) 202 connects to instruction cache 204. Instruction cache 204 holds instructions for multiple programs (threads) to be executed. Instruction cache 204 also has an interface to level 2 (L2) cache/memory 206. IFU 202 requests instructions from instruction cache 204 according to an instruction address, and passes instructions to instruction decode unit 208. In an illustrative embodiment, IFU 202 may request multiple instructions from instruction cache 204 for up to two threads at the same time. Instruction decode unit 208 decodes multiple instructions for up to two threads at the same time and passes decoded instructions to instruction sequencer unit (ISU) 209.

Processor 200 may also include issue queue 210, which receives decoded instructions from ISU 209. Instructions are stored in the issue queue 210 while awaiting dispatch to the appropriate execution units. For an out-of order processor to operate in an in-order manner, ISU 209 may selectively issue instructions quickly using false dependencies between each instruction. If the instruction does not produce data, such as in a read after write dependency, ISU 209 may add an additional source operand (also referred to as a consumer) per instruction to point to the previous target instruction (also referred to as a producer). Issue queue 210, when issuing the producer, may then wakeup the consumer for issue. By introducing false dependencies, a chain of dependent instructions may then be created, whereas the instructions may then be issued only in-order. ISU 209 uses the added consumer for instruction scheduling purposes and the instructions, when executed, do not actually use the data from the added dependency. Once ISU 209 selectively adds any required false dependencies, then issue queue 210 takes over and issues the instructions in order for each thread, and outputs or issues instructions for each thread to execution units 212, 214, 216, 218, 220, 222, 224, 226, and 228 of the processor. This process will be described in more detail in the following description.

In an illustrative embodiment, the execution units of the processor may include branch unit 212, load/store units (LSUA) 214 and (LSUB) 216, fixed point execution units (FXUA) 218 and (FXUB) 220, floating point execution units (FPUA) 222 and (FPUB) 224, and vector multimedia extension units (VMXA) 226 and (VMXB) 228. Execution units 212, 214, 216, 218, 220, 222, 224, 226, and 228 are fully shared across both threads, meaning that execution units 212, 214, 216, 218, 220, 222, 224, 226, and 228 may receive instructions from either or both threads. The processor includes multiple register sets 230, 232, 234, 236, 238, 240, 242, 244, and 246, which may also be referred to as architected register files (ARFs).

An ARF is a file where completed data is stored once an instruction has completed execution. ARFs 230, 232, 234, 236, 238, 240, 242, 244, and 246 may store data separately for each of the two threads and by the type of instruction, namely general purpose registers (GPRs) 230 and 232, floating point registers (FPRs) 234 and 236, special purpose registers (SPRs) 238 and 240, and vector registers (VRs) 244 and 246. Separately storing completed data by type and by thread assists in reducing processor contention while processing instructions.

The processor additionally includes a set of shared special purpose registers (SPR) 242 for holding program states, such as an instruction pointer, stack pointer, or processor status word, which may be used on instructions from either or both threads. Execution units 212, 214, 216, 218, 220, 222, 224, 226, and 228 are connected to ARFs 230, 232, 234, 236, 238, 240, 242, 244, and 246 through simplified internal bus structure 249.

In order to execute a floating point instruction, FPUA 222 and FPUB 224 retrieves register source operand information, which is input data required to execute an instruction, from FPRs 234 and 236, if the instruction data required to execute the instruction is complete or if the data has passed the point of flushing in the pipeline. Complete data is data that has been generated by an execution unit once an instruction has completed execution and is stored in an ARF, such as ARFs 230, 232, 234, 236, 238, 240, 242, 244, and 246. Incomplete data is data that has been generated during instruction execution where the instruction has not completed execution. FPUA 222 and FPUB 224 input their data according to which thread each executing instruction belongs to. For example, FPUA 222 inputs completed data to FPR 234 and FPUB 224 inputs completed data to FPR 236, because FPUA 222, FPUB 224, and FPRs 234 and 236 are thread specific.

During execution of an instruction, FPUA 222 and FPUB 224 output their destination register operand data, or instruction data generated during execution of the instruction, to FPRs 234 and 236 when the instruction has passed the point of flushing in the pipeline. During execution of an instruction, FXUA 218, FXUB 220, LSUA 214, and LSUB 216 output their destination register operand data, or instruction data generated during execution of the instruction, to GPRs 230 and 232 when the instruction has passed the point of flushing in the pipeline. During execution of a subset of instructions, FXUA 218, FXUB 220, and branch unit 212 output their destination register operand data to SPRs 238, 240, and 242 when the instruction has passed the point of flushing in the pipeline. Program states, such as an instruction pointer, stack pointer, or processor status word, stored in SPRs 238 and 240 indicate thread priority 252 to ISU 209. During execution of an instruction, VMXA 226 and VMXB 228 output their destination register operand data to VRs 244 and 246 when the instruction has passed the point of flushing in the pipeline.

Data cache 250 may also have associated with it a non-cacheable unit (not shown) which accepts data from the processor and writes it directly to level 2 cache/memory 206. In this way, the non-cacheable unit bypasses the coherency protocols required for storage to cache.

In response to the instructions input from instruction cache 204 and decoded by instruction decode unit 208, ISU 209 selectively dispatches the instructions to issue queue 210 and then onto execution units 212, 214, 216, 218, 220, 222, 224, 226, and 228 with regard to instruction type and thread. In turn, execution units 212, 214, 216, 218, 220, 222, 224, 226, and 228 execute one or more instructions of a particular class or type of instructions. For example, FXUA 218 and FXUB 220 execute fixed point mathematical operations on register source operands, such as addition, subtraction, ANDing, ORing and XORing. FPUA 222 and FPUB 224 execute floating point mathematical operations on register source operands, such as floating point multiplication and division. LSUA 214 and LSUB 216 execute load and store instructions, which move operand data between data cache 250 and ARFs 230, 232, 234, and 236. VMXA 226 and VMXB 228 execute single instruction operations that include multiple data. Branch unit 212 executes branch instructions which conditionally alter the flow of execution through a program by modifying the instruction address used by IFU 202 to request instructions from instruction cache 204.

Instruction completion unit 254 monitors internal bus structure 249 to determine when instructions executing in execution units 212, 214, 216, 218, 220, 222, 224, 226, and 228 are finished writing their operand results to ARFs 230, 232, 234, 236, 238, 240, 242, 244, and 246. Instructions executed by branch unit 212, FXUA 218, FXUB 220, LSUA 214, and LSUB 216 require the same number of cycles to execute, while instructions executed by FPUA 222, FPUB 224, VMXA 226, and VMXB 228 require a variable, and a larger number of cycles to execute. Therefore, instructions that are grouped together and start executing at the same time do not necessarily finish executing at the same time. "Completion" of an instruction means that the instruction is finishing executing in one of execution units 212, 214, 216, 218, 220, 222, 224, 226, or 228, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 254 monitors for the completion of instructions, and sends control information 256 to ISU 209 to notify ISU 209 that more groups of instructions can be dispatched to execution units 212, 214, 216, 218, 220, 222, 224, 226, and 228. ISU 209 sends dispatch signal 258, which serves as a throttle to bring more instructions down the pipeline to the dispatch unit, to IFU 202 and instruction decode unit 208 to indicate that it is ready to receive more decoded instructions. While processor 200 provides one detailed description of a single integrated circuit superscalar microprocessor with dual-thread simultaneous multi-threading (SMT) that may also be operated in a single threaded mode, the illustrative embodiments are not limited to such microprocessors. That is, the illustrative embodiments may be implemented in any type of processor using a pipeline technology and which provides multi-threaded operation, whether this be two simultaneous threads (SMT2), four simultaneous threads (SMT4), or more simultaneous threads.

With regard to the illustrative embodiments, a compiler may analyze code provided to the compiler to identify portions of the code that may be executed more efficiently using an assist thread to offload work from a main thread, the "main thread" being a thread spawned by an operating system through a software process and the "assist thread" being an existing idle thread, already created by an operating system but not performing any useful work, that may be "borrowed" by the hardware of the processor to assist the main thread. It should be noted that while the illustrative embodiments described herein will focus on embodiments in which the main thread and the "borrowed" idle threads are present on the same processor for ease of the description, the illustrative embodiments are not limited to such. Rather, the main thread and the "borrowed" idle threads may be present on different processors on the same or different processor chips. It is beneficial for the main thread and any idle threads "borrowed" to be assist threads share the same shared memory pages and address translations. In embodiments where the main thread and assist threads are on different processors, or cores, of a multiprocessor chip, additional hardware for copy data flows and monitoring aborting and stop assist thread conditions may be utilized, as will be apparent to those of ordinary skill in the art in view of present description.

A processor chip, in accordance with the illustrative embodiments, may make use of multiple processor cores, each processor core having a configuration similar to that shown in FIG. 2 above. Thus, each processor core may be capable of executing two or more threads at substantially the same time. At various points during the operation of the processor cores, one or more of the threads executing on the processor core may become idle. For example, in a simultaneous multithreading 4 (SMT4) processor, where 4 threads can be executed simultaneously, there may be 3 threads performing work and 1 thread may be idle or inactive. Alternatively, if the processor is a SMT4 processor, but it is operating in a lower SMT mode, e.g., SMT2 mode where only 2 simultaneously executed threads are utilized, then 2 threads may be idle or inactive.

The hardware of a processor core's pipeline may, in response to receiving the "branch to assist thread" instruction, identify if any of the processor cores of the processor chip currently has an idle thread. If so, the hardware of the processor core's pipeline may "borrow" that thread to assist a main thread that the processor core is currently executing. This borrowing is performed in hardware and does not require the copying over of all of the register state information from the main thread's context to the assist thread's context, as mentioned above.

The compiler may analyze the code for particular types of instructions, operations, memory or data access patterns, or the like, to identify portions of the code that may benefit from spawning an assist thread. However, instead of spawning an assist thread using software mechanisms, such as the operating system or the like, as would be done in prior art mechanisms, the mechanisms of the illustrative embodiments introduce a new "branch to assist thread" instruction that instructs the hardware of the processor pipeline to look for an existing idle thread on the same or a different processor core as the one that the main thread is executing in, which can be "borrowed" to be used as an assist thread for the main thread.

As examples, the compiler may analyze the code that is input to the compiler and identify loops in the code having irregular data access patterns, e.g., variable stride, data driven indexing, or the like. In such a case, pre-fetching of data into the cache may be an optimization that the compiler may introduce into the code and which may be further optimized by performing such pre-fetching using a hardware spawned assist thread. Moreover, to speed up address translation, the compiler may introduce prefetching of address translations into the ERAT or TLB of the processor, which again are operations that may be more efficiently handled by a hardware spawned assist thread while the main thread is performing other processing of code.

As further examples, the compiler may identify other non-synchronous operations that may be offloaded to a hardware spawned assist thread rather than performing them within the main thread. Such non-synchronous operations may include garbage collection operations, data moving operations, encryption operations, database row compression operations, and the like. Moreover, the compiler may identify portions of code that may be performed in parallel, such as speculative branches, small loops having a relatively low number of iterations, portions of loops, i.e. a subset of iterations, that may be independently executed without data dependencies, runtime dependence checking operations, fine-grain task parallelization operations, such as memory manipulation and search algorithms, and the like.

The results of these compiler optimizations is that code that is sent to processor cores for execution may include the "branch to assist thread" instructions of the illustrative embodiments. The "branch to assist thread" instruction may be recognized by the hardware of the processor core's pipeline which then causes the hardware to operate in the manner described hereafter to determine if there are existing idle threads that can be borrowed as assist threads for the main thread being executed by the processor core and if so, to perform the necessary operations to populate the assist thread's context with information from the main thread and start the assist thread's execution.

Figure 3:
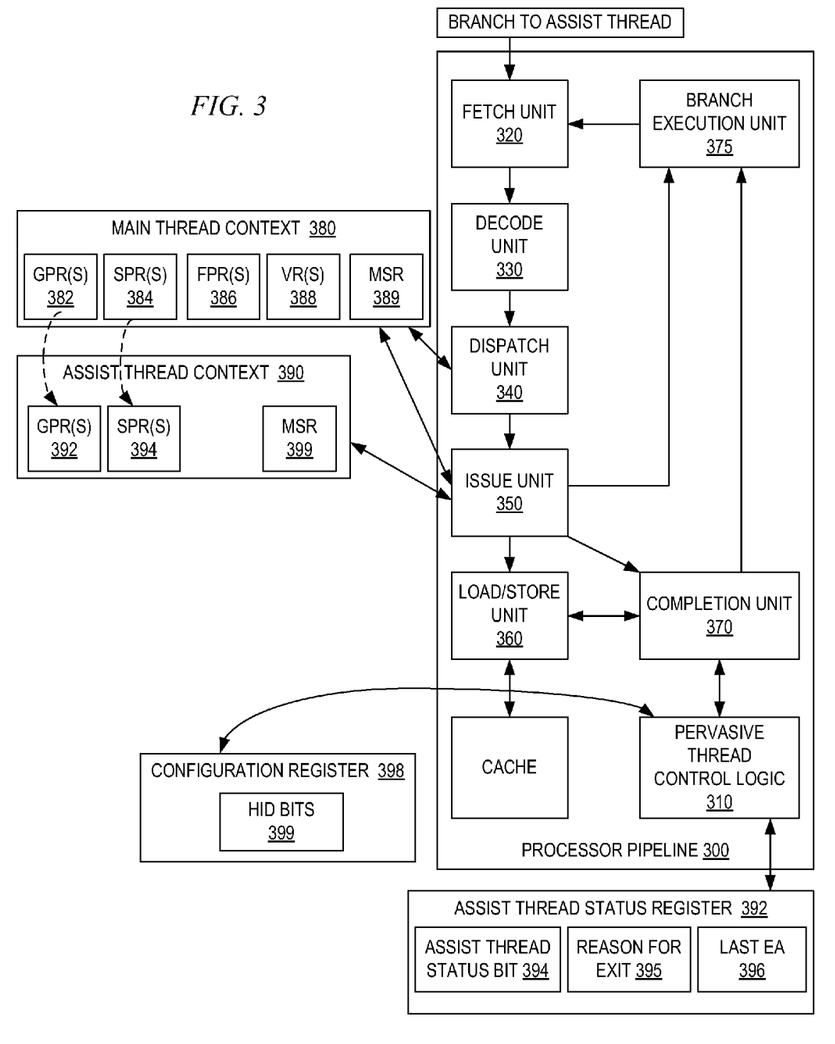
FIG. 3 is an example block diagram of a processor pipeline in accordance with one illustrative embodiment.

FIG. 3 is an example block diagram of a processor pipeline in accordance with one illustrative embodiment. The elements shown in FIG. 3 may correspond to elements in FIG. 2 that are augmented to include circuit logic to implement the operations as recited hereafter. In addition, as shown in FIG. 3, the processor pipeline 300 includes pervasive thread control logic 310 that is used to control the overall operation of the processor pipeline 300 with regard to hardware spawned assist threads using the mechanisms of the illustrative embodiments, as described hereafter.

With the mechanisms of the illustrative embodiments, when the "branch to assist thread" instruction is received in the processor pipeline 300, the fetch unit 320 determines and stores the offset of the first instruction that the assist thread is to start executing, if such an assist thread is available. This offset of the first instruction for the assist thread is referred to as the "target address" of the assist thread. The fetch unit 320 then waits for the assist thread entry point conditions to be met, i.e. all of the required registers, e.g., GPRs, SPRs, and the like, from the main thread's context 380 are copied over to the assist thread's context 390, the assist thread's clock is enabled, and the like. Once these conditions are met, the instruction is provided to the dispatch unit 340 of the processor pipeline 300 via a decode unit 330.

Within the dispatch unit 340, all the younger instructions, i.e. instructions fetched after the "branch to assist thread" instruction, from the main thread are held in the dispatch unit 340 until selected GPRs 382, SPRs 384, and the like, associated with the main thread's context 380 are copied over to the assist thread's context 390. The "branch to assist thread" instruction may have associated bits for indicating what register states are to be copied over from the main thread's context 380 to the assist thread's context 390. These bits may be set by the compiler according to the types of instructions, operations, or the like, that are to be performed by the assist thread. For example, a "copy bit" may be set in the "branch to assist thread" instruction to indicate whether to copy the floating point register (FPR) 386 and vector register (VR) 388 states corresponding to the main thread over to the assist thread's context 390.

Each thread context 380 and 390 of the processor may have an associated machine state register (MSR) 389 and 399 which may have various bits to indicate various machine states, including whether an assist thread may be spawned at all from a main thread, either via software or the hardware mechanisms of the illustrative embodiments. The MSR 389, for example, may have a MSR assist thread enable bit which, if set, means that assist threads may be spawned by hardware/software. However, if the MSR assist thread enable bit is not set, then assist threads are not available to be spawned from this particular main thread, i.e. the spawning of assist threads from main threads may be controlled by the operating system, hypervisor, or other privileged process, setting such MSR assist thread enable bits for the various main threads. In such a case, if the processor pipeline 300 receives a "branch to assist thread" instruction and the MSR assist thread enable bit is not set, then an exception may be thrown which is then handled by an appropriate exception handler of the operating system. The MSR assist thread enable bit may be set by the operating system.

If the MSR assist thread enable bit is set, the dispatch unit 340 may make a determination as to whether there are any idle threads available that can be used as assist threads. For example, in a SMTx processor, where x may be any integer value indicating the number of simultaneous threads that may be executed by the processor, if the processor is configured to operate in a single thread mode, then x−1 number of threads are available as idle threads that may be used as assist threads, but the processor's mode of operation would need to be increased at least one level, i.e. from a single thread mode to at least an SMT2 mode, in order to permit the assist thread to be utilized. Facilities are provided in processor architectures to allow the changing of the SMT mode that the processor is operating in.

As another example, if the processor is operating in an SMT2 mode and there is only 1 thread running on the processor, and x−1 number of threads are in a sleep state, i.e. an idle or inactive state, then transitioning to another SMT mode is not necessary since the current SMT mode is not being fully utilized. To the contrary, one of the idle threads is selected and its state is transitioned from an idle state to an active assist thread state. However, if in the SMT2 mode both threads are being utilized, then a transition to a higher SMT mode, e.g., SMT4, would be necessary to spawn additional threads that may be idle and selectable as an assist thread. All the information about how many threads are currently running, the SMT mode of the processor, how many threads are in a sleep or idle state, and the like, is available in the pervasive thread control logic 310.

As mentioned above, if there are no available idle threads, then a determination may be made by the dispatch unit 340 as to whether the processor may be switched to a different mode of operation to facilitate the spawning of a new thread to operate as an assist thread. For example, the processor may be switched from a single thread mode of operation to a multiple thread mode of operation, or from one multiple thread mode of operation (e.g., SMT2) to another multiple thread mode of operation (e.g., SMT4), or the like. This determination may be made by looking at the setting of a hardware implemented dependent register (HID) bit 399 in a mode configuration register 398 that can be set by the operating system, hypervisor, or the like, upon system configuration or reconfiguration. If the HID bit 399 is not set to indicate another mode of operation that the processor can be switched to, i.e. the processor's mode cannot be switched to support an assist thread, then from the main thread's point of view, the "branch to assist thread" instruction may be considered a no-op instruction with the exception that an assist thread status bit in an assist thread status register 392 may be set to indicate that the assist thread is not started due to no available thread.

The assist thread status register 392 may be part of the pervasive thread control logic 310, may be provided as part of the main thread context 380, or may be separate from the pervasive thread control logic 310 and/or main thread context 380 but accessible by the pervasive thread control logic 310. Each assist thread may be represented by an associated assist thread status register 392. The assist thread status register 392 is used to report the status of the main thread's assist thread. If the assist thread does not start, a status bit in the register is set so that the main thread may sample it later. In addition, at an assist thread's exit point, an indicator of a reason for the assist thread's exit 395 may be stored in the assist thread status register 392 along with an effective address (EA) of the last completed instruction of the assist thread 396. The assist thread may exit or abort for many different reasons including an abort assist thread (SAP) instruction from the assist thread instruction stream or main thread instruction stream, a main thread wanting to start a new assist thread, an exception in the assist thread, a segment lookaside buffer (SLB) update from either the main thread or the assist thread, a main thread swapping out, or going into, a sleep state, an active assist thread aborting if a new thread is enabled by software and has a same thread identifier as the assist thread, an assist thread tries to perform an "ill-behaved" memory access, or the like. Various identifiers may be provided and may be stored in the assist thread status register 392 to indicate which, if any, of these reasons were the cause of an assist thread's exit or abort.

If there is no available idle thread to "borrow" to be an assist thread, and the HID bit 399 indicates that a mode switch in the processor is possible, then the mode switch may be performed and one or more additional threads may be spawned using software mechanisms. Thereafter, or if there is already an available idle thread available, one of these idle threads may be selected to be used as an assist thread. For example, idle threads may be grouped by the pervasive thread control logic 310 into different levels of idleness, e.g., nap, doze, sleep, or the like. The pervasive thread control logic 310 may further maintain information on which threads in the idle state have been in the idle state the longest and which have been idle the shortest amount of time, e.g., using timestamps or the like. The pervasive thread control logic 310 may select an idle thread based on this information by prioritizing the threads according to how long they have been idle and their level of idleness such that an idle thread that has been idle the longest and has a deepest level of idleness is chosen for use as an assist thread since such threads are unlikely to be used again soon by the software.

The dispatch unit 340 may dispatch the "branch to assist thread" instruction to the issue unit 350 with an indication of the selected assist thread. The issue unit 350 may copy the selected GPR 382, SPR 384, and other selected main thread registers from the main thread's context 380 into the assist thread's context 390. The issue unit 350 may then issue the "branch to assist thread" instruction to the load/store unit 360 which load/stores data to/from the cache. Moreover, the load/store unit 360 enforces thread synchronization to ensure that all the main thread's older stores, i.e. store instructions fetched prior to the "branch to assist thread" instruction, are visible to the assist thread once the "branch to assist thread" instruction is in the next to complete (confirm path) stage of the pipeline. This thread synchronization is enforced by the load/store unit 360 by performing a virtual synchronization operation that performs a cross thread checking method to communicate between the main thread and the assist thread. The virtual synchronization operation basically involves blocking all younger instructions from the main thread that come in after the branch to assist thread instruction and draining all the outstanding store operations before allowing younger instructions from the main thread or instructions from the assist thread to come in the load/store pipeline. In this way, the virtual synchronization operation ensures that all the data from the older load and store instructions from the main thread is available to the assist thread instructions, thereby maintaining the order of threads.

The issue unit 350 may further issue the "branch to assist thread" instruction to the completion unit 370 which communicates with the pervasive thread control logic 310 which is responsible for monitoring the status and execution of the assist threads, selecting an appropriate assist thread from idle threads based on information maintained regarding idle threads as discussed above, switching SMT modes if necessary, starting assist thread clocks, and the like. The completion unit 370 will determine whether all of the assist thread entry point conditions and routines have completed successfully, i.e. that thread synchronization performed by the load/store unit 360 was completed successfully without an exception being generated and that all selected main thread registers 382, 384, and the like, were copied over into the assist thread context 390 without errors. To determine if the assist thread entry point conditions and routines have completed successfully, each unit in the processor that owns part of the assist thread entry point routine will send a bit to the pervasive thread control logic 310 to indicate it is done without error or if an error occurred. The pervasive thread control logic 310 may sample all the status bits from all the units before starting an assist thread. If all of the assist thread's entry point conditions and routines have completed successfully, then the completion unit 370 instructs the fetch unit 320, via the branch execution unit 375, to start fetching instructions from the assist thread's target address.

It should be noted that while the assist thread is executing via the processor pipeline, the main thread is allowed to continue executing in a multi-threaded manner as well. Thus, both the main thread and the assist thread are executed substantially in parallel and substantially simultaneously. However, the work that would otherwise be done by the main thread with regard to the portion of code associated with the "branch to assist thread" instruction, is offloaded to the assist thread. Hence the work of main thread and assist thread are performed in parallel causing the execution of the code to be performed more quickly and more efficiently.

Thus, the illustrative embodiments provide hardware based mechanisms for borrowing existing idle threads to be used as assist threads for a main thread to thereby offload the work from the main thread and increase the performance of the code. The hardware mechanisms operate more quickly than convention software thread spawning mechanisms with regard to assist threads and furthermore, do not require as many register states to be copied over from the main thread context to the assist thread context.

Figure 4:
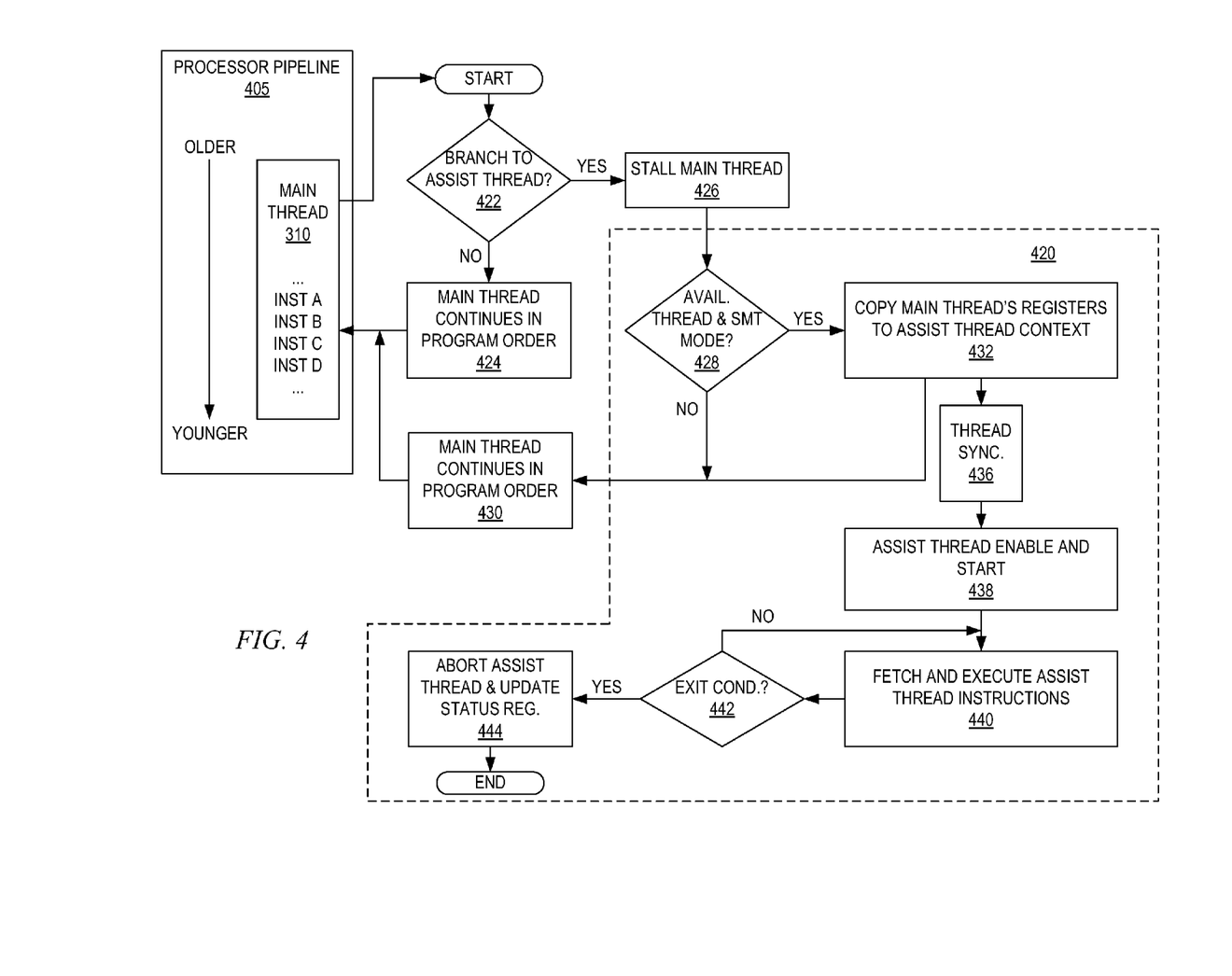
FIG. 4 is an example diagram illustrating an operation of the pervasive thread control logic in accordance with one illustrative embodiment.

FIG. 4 is an example diagram illustrating an operation of the pervasive thread control logic in accordance with one illustrative embodiment. While FIG. 4 shows certain operations being performed by the pervasive thread control logic, the illustrative embodiments are not limited to such an embodiment. To the contrary, FIG. 4 is only an example of one illustrative embodiment and the operations may be distributed to other elements of the processor, as well as the pervasive thread control logic may perform other operations not explicitly shown in FIG. 4, without departing from the spirit and scope of the illustrative embodiments.

As shown in FIG. 4, a main thread 410 of a computer program may be executed in program order from older instructions to younger instructions in the processor pipeline 405. As part of this main thread 410, a "branch to assist thread" instruction may be encountered causing the pervasive thread control logic 420 to operate to control the selection of an existing idle thread as an assist thread for the main thread 410.

The fetch unit 320 and dispatch unit 340 identify whether a "branch to assist thread" instruction is encountered during the processing of the main thread 410 (step 422). If the "branch to assist thread" instruction is not encountered, the operation continues the execution of the main thread in program order (step 424). Otherwise, if the "branch to assist thread" instruction is encountered, the main thread may be stalled (step 426). A determination is made as to whether there is an available idle thread and/or the processor mode can be switched to a SMT mode that will permit the spawning of a new idle thread (step 428). This may be done via communication between the dispatch unit and the pervasive thread control logic which stores the thread control information or has access to this thread control information upon which the determination may be made. If there is no available idle thread and the processor mode cannot be set to cause a new idle thread to be spawned, then the main thread continues the execution in program order, thereby causing the main thread to perform the work that would otherwise have been offloaded to an assist thread (step 430).

If, however, either there is an available idle thread or the processor's mode can be modified to allow the spawning of a new idle thread, then the selected ones of the main thread's registers in the main thread's context are copied over to the idle thread (now the selected "assist thread") context (step 432). The main thread continues its execution in program order (step 434) with the instructions that are not offloaded to the assist thread, e.g., instructions that are younger than the branch to assist thread instruction.

Meanwhile, the load/store unit performs thread synchronization operations (step 436) and the assist thread is enabled and started (step 438). The fetch unit then begins fetching instructions for the assist thread based on the assist thread's target address (step 440). A determination is made as to whether an exit condition is encountered for the assist thread, i.e. the portion of the code offloaded to the assist thread is completed or an exception occurs (step 442). If not, the operation returns to step 440 and continues to fetch instructions for the assist thread. If so, the assist thread is aborted and status registers are updated to indicate the reason for the abort of the assist thread, the effective address of the last completed instruction of the assist thread, and the like (step 444).

It should be noted that if an assist thread is successfully started, a bit in the assist thread status register may be set to indicate successful start of the assist thread. Alternatively, if the assist thread does not start, then a corresponding bit may also be set in the assist thread status register to indicate that the thread did not start. If the assist thread is exited or aborted, then bits in the assist thread status registers are set to indicate the exit conditions, i.e. the reason for the exit or abort of the assist thread.

Once the assist thread starts fetching instructions, it will stay in the loop of 440-442 for a while. If there is an exit condition, such as an end SAP instruction from either the main thread or the assist thread, any exception/error conditions, such as memory translation violation, access registers that are not copied over, etc., the operation will go to step 444 and record the exit condition in the assist thread status register and retire the thread by putting the thread back into an idle state.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system comprising:
a processor; and
a memory coupled to the processor, wherein the processor comprises a fetch unit and hardware implemented pervasive thread control logic coupled to the fetch unit, wherein:
the fetch unit is configured to receive a branch-to-assist-thread instruction of a main thread, wherein the branch-to-assist-thread instruction informs hardware of the processor to look for an already spawned idle thread to be used as an assist thread; and
the hardware implemented pervasive thread control logic is configured to:
determine if one or more already spawned idle threads are available for use as an assist thread;
select an idle thread from the one or more already spawned idle threads if it is determined that one or more already spawned idle threads are available for use as an assist thread, to thereby provide the assist thread; and
offload a portion of a workload of the main thread to the assist thread.

2. The data processing system of claim 1, wherein the fetch unit is further configured to store an offset of a first instruction to be executed by the assist thread.

3. The data processing system of claim 2, wherein the hardware implemented pervasive thread control logic offloads a portion of the workload of the main thread to the assist thread by:
copying over only selected register state data from a main thread context to an assist thread context associated with the assist thread; and
starting the assist thread at the offset of the first instruction to be executed by the assist thread.

4. The data processing system of claim 3, wherein the selected register state data is less than a total amount of register state data associated with the main thread context.

5. The data processing system of claim 3, wherein the branch-to-assist-thread instruction comprises bits identifying which register state data to copy over from the main thread context to the assist thread context.

6. The data processing system of claim 3, wherein the main thread continues execution of instructions younger than the branch-to-assist-thread instruction after starting the assist thread.

7. The data processing system of claim 1, wherein the hardware implemented pervasive thread control logic determines if one or more already spawned idle threads are available for use as an assist thread further comprises determining if a machine state register associated with the main thread context indicates that assist threads may be spawned from the main thread, and wherein an assist thread is selected from the one or more idle threads only if the machine state register indicates that an assist thread may be spawned from the main thread.

8. The data processing system of claim 1, wherein, in response to a determination that one or more already spawned idle threads are not available for use as an assist thread, the hardware implemented pervasive thread control logic determines if one or more already spawned idle threads are available for use as an assist thread by:
determining if an operational mode of the processor may be changed to a higher simultaneous multithreading operational mode in which one or more additional threads may be spawned;
modifying the operational mode of the processor to a higher simultaneous multithreading operational mode if it is determined that a change of the operational mode of the processor may be performed; and
spawning the one or more additional threads and placing the one or more additional threads in an idle state.

9. The data processing system of claim 1, wherein the processor is further configured to:
execute the assist thread in the processor;
determine if the assist thread aborts; and
store, in an assist thread status register of the processor, an identifier of a reason for the abort of the assist thread if it is determined that the assist thread aborts.

10. The data processing system of claim 1, wherein the hardware implemented pervasive thread control logic selects an idle thread from the one or more already spawned idle threads to be the assist thread by:
prioritizing the one or more already spawned idle threads according to an amount of time the one or more already spawned idle threads have been idle; and
selecting an idle thread from the one or more already spawned idle threads based on the prioritization of the one or more already spawned idle threads, and wherein selecting an idle thread from the one or more already spawned idle threads comprises selecting an idle thread that has been idle for a longest period of time relative to other already spawned idle threads in the one or more already spawned idle threads.

11. A processor, comprising:
a fetch unit; and
hardware implemented pervasive thread control logic coupled to the fetch unit, wherein:
the fetch unit is configured to receive a branch-to-assist-thread instruction of a main thread,
the branch-to-assist-thread instruction informs hardware of the processor to look for an already spawned idle thread to be used as an assist thread, and
the hardware implemented pervasive thread control logic is configured to:
determine if one or more already spawned idle threads are available for use as an assist thread;
select an idle thread from the one or more already spawned idle threads if it is determined that one or more already spawned idle threads are available for use as an assist thread, to thereby provide the assist thread; and offload a portion of a workload of the main thread to the assist thread.

* * * * *